United States Patent
Washizu et al.

(10) Patent No.: US 10,877,712 B2
(45) Date of Patent: Dec. 29, 2020

(54) PRINTER, CONTROL METHOD OF PRINTER, AND PRINTING SYSTEM

(71) Applicant: SEIKO EPSON CORPORATION, Tokyo (JP)

(72) Inventors: Yuki Washizu, Matsumoto (JP); Keigo Mori, Matsumoto (JP); Koji Hashimoto, Matsumoto (JP); Dai Tanaka, Matsumoto (JP); Akihiro Mishima, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/553,588

(22) Filed: Aug. 28, 2019

(65) Prior Publication Data

US 2020/0073610 A1 Mar. 5, 2020

(30) Foreign Application Priority Data

Aug. 30, 2018 (JP) ................. 2018-161447

(51) Int. Cl.
*G06F 3/12* (2006.01)
*G06K 15/02* (2006.01)
*G06Q 20/20* (2012.01)
*G07G 1/00* (2006.01)
*G07G 5/00* (2006.01)

(52) U.S. Cl.
CPC .......... *G06F 3/1293* (2013.01); *G06F 3/1279* (2013.01); *G07G 1/0045* (2013.01)

(58) Field of Classification Search
None
See application file for complete search history.

(56) References Cited

U.S. PATENT DOCUMENTS

| | | | | |
|---|---|---|---|---|
| 7,685,257 B2* | 3/2010 | King | ............ | H04L 29/06 370/431 |
| 2005/0102377 A1* | 5/2005 | King | ............ | H04L 29/06 709/219 |
| 2011/0258318 A1* | 10/2011 | Peng | ............ | H04L 47/781 709/226 |

(Continued)

FOREIGN PATENT DOCUMENTS

| | | |
|---|---|---|
| JP | 2016-049723 | 4/2016 |
| JP | 2016-170803 | 9/2016 |

*Primary Examiner* — Beniyam Menberu
(74) *Attorney, Agent, or Firm* — Workman Nydegger

(57) ABSTRACT

A printer includes a processor configured to be communicatively coupled to an external device and a POS terminal on which a web browser operates, and enabling control of the external device by a control object with respect to the POS terminal based on relationship information, in which the processor enables the control of the external device by the control object with respect to a first POS terminal based on first relationship information, deletes the first relationship information while the control object is not deleted when the control of the external device by the first POS terminal ends, generates second relationship information indicating a relationship between a second POS terminal and the control object when a request for the external device from the second POS terminal is received after deleting the first relationship information, and enables the control of the external device from the second POS terminal by the control object.

12 Claims, 6 Drawing Sheets

(56) References Cited

U.S. PATENT DOCUMENTS

| | | | |
|---|---|---|---|
| 2014/0006189 A1* | 1/2014 | Takasu | G06Q 20/204 |
| | | | 705/17 |
| 2014/0211255 A1* | 7/2014 | Takasu | G06F 3/1204 |
| | | | 358/1.15 |
| 2014/0214565 A1* | 7/2014 | Takasu | G07G 1/0009 |
| | | | 705/16 |
| 2015/0002896 A1 | 1/2015 | Takasu et al. | |
| 2015/0355874 A1* | 12/2015 | Kamoi | H04N 1/0023 |
| | | | 358/1.15 |
| 2015/0365272 A1* | 12/2015 | Takasu | G06Q 20/202 |
| | | | 709/223 |
| 2016/0380849 A1* | 12/2016 | Kawamori | G06Q 10/10 |
| | | | 709/224 |
| 2017/0012821 A1* | 1/2017 | Sa | G06F 13/14 |

* cited by examiner

PRINTER, CONTROL METHOD OF PRINTER, AND PRINTING SYSTEM

The present application is based on, and claims priority from JP Application Serial Number 2018-161447, filed Aug. 30, 2018, the disclosure of which is hereby incorporated by reference herein in its entirety.

BACKGROUND

1. Technical Field

The present disclosure relates to a printer, a control method of the printer, and a printing system.

2. Related Art

In related art, there is known a technology where a terminal in which a web browser operates controls a barcode reader coupled to a printer (see, for example, JP-A-2016-49723). JP-A-2016-49723 discloses a technology in which a tablet terminal in which a web browser operates acquires barcode data read by the barcode reader coupled to the printer via the printer.

The printer described in JP-A-2016-49723 generates a control object which is an object controlling an external device, and the terminal controls the external device on a one-to-one basis by the generated control object. It is disclosed that when the terminal configured to control the external device is switched to another terminal, the printer deletes the control object corresponding to the external device to generate a new control object, and another terminal controls the external device on a one-to-one basis by the new generated control object.

In related art, it is not possible to quickly switch a terminal controlling an external device by a control object.

SUMMARY

An advantage of some aspects of the present disclosure is to quickly switch a terminal controlling an external device by a control object.

An aspect of the present disclosure is directed to a printer including a printing head, and a processor configured to be coupled to an external device and a terminal on which a web browser operates, and enabling control of the external device from the terminal by a control object controlling the external device based on information indicating a relationship between the terminal and the control object, in which the processor generates first information indicating a relationship between a first terminal and the control object when a request for the external device is received from the first terminal, and enables the control of the external device by the control object with respect to the first terminal based on the first information, and the processor deletes the first information while the control object is not deleted when the control of the external device by the first terminal ends, generates second information indicating a relationship between a second terminal and the control object when a request for the external device from the second terminal is received after deleting the first information, and enables the control of the external device from the second terminal by the control object based on the second information.

In the aspect of the present disclosure, the processor may transmit information indicating that the external device is not controllable to the second terminal when a request for the external device is received from the second terminal before deleting the first information.

In the aspect of the present disclosure, the first information may include identification information related to communication with the first terminal or information indicating that the external device is being controlled by the first terminal, and the second information includes identification information related to communication with the second terminal or information indicating that the external device is being controlled by the second terminal.

In the aspect of the present disclosure, the external device may be a barcode reader, the terminal may be a POS terminal which performs accounting processing based on barcode data read by the barcode reader, and the printer may print a receipt based on the accounting processing performed by the POS terminal via the printing head.

Another aspect of the present disclosure is directed to a control method of a printer configured to be coupled to an external device and a terminal on which a web browser operates, the control method including generating first information indicating a relationship between a first terminal and a control object controlling the external device when a request for the external device is received from the first terminal to enable control of the external device by the control object with respect to the first terminal based on the first information, deleting the first information while the control object is not deleted when the control of the external device by the first terminal ends, and generating second information indicating a relationship between a second terminal and the control object when a request for the external device is received from the second terminal after the first information is deleted to enable the control of the external device from the second terminal by the control object based on the second information.

Another aspect of the present disclosure is directed to a printing system including an external device and a printer configured to be coupled to the external device, and a first terminal and a second terminal on which a web browser operates, in which the printer generates first information indicating a relationship between the first terminal and a control object controlling the external device when a request for the external device is received from the first terminal, and enables control of the external device by the control object with respect to the first terminal based on the first information, and the printer deletes the first information while the control object is not deleted when the control of the external device by the first terminal ends, generates second information indicating a relationship between the second terminal and the control object when a request for the external device is received from the second terminal after the first information is deleted, and enables the control of the external device from the second terminal by the control object with respect to the second terminal based on the second information.

DESCRIPTION OF EXEMPLARY EMBODIMENTS

Figure 1:
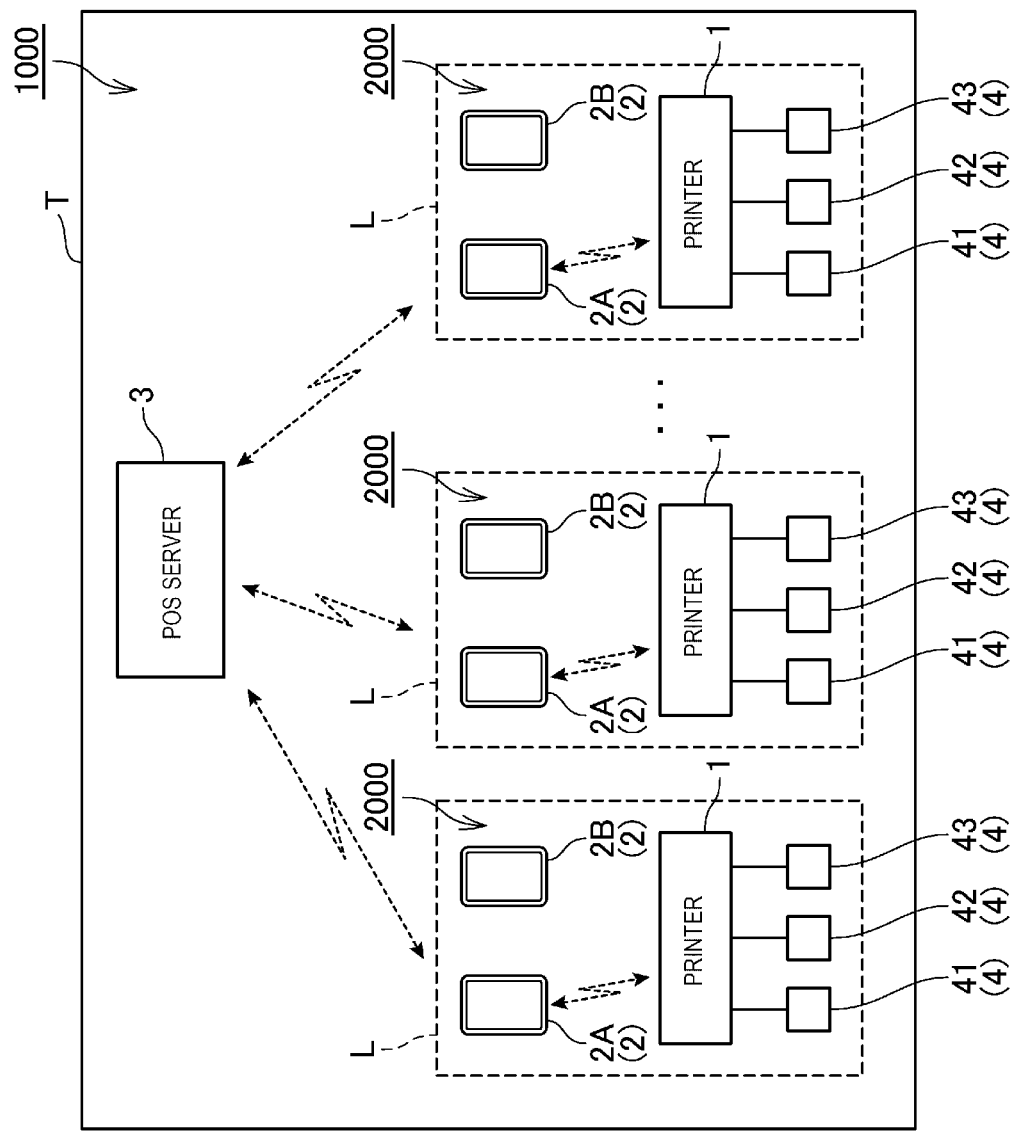
FIG. 1 shows the configuration of a POS system.

FIG. 1 is a diagram showing a configuration of a point of sales (POS) system 1000.

The POS system 1000 is a system used in an operation such as a shopping center, a retail business such as a convenience store and in-vehicle sales, and a food and drink business such as a restaurant, a tearoom and a pub. The POS system 1000 has, for example, a function of managing a sales status, a stock status, a revenue status, or the like of a product in a store, a function of performing accounting in accordance with a product purchased by a customer, a function of issuing a receipt in accordance with accounting, or the like.

In the present embodiment, a case where the POS system 1000 is applied to a store T provided with one or a plurality of register counters L which perform accounting processing is exemplified. FIG. 1 exemplifies the case where the plurality of the register counters L are provided in the store T.

An accounting system 2000, which is an aspect of a printing system, is applied to one register counter L. The accounting system 2000 includes a printer 1 to which a first POS terminal 2A and a second POS terminal 2B are configured to be coupled, and a device 4. The device 4 is a name of an external device configured to be coupled to the printer 1 such as a barcode reader 41, a cash changer 42, and a card reader 43. FIG. 1 shows a case where the printer 1 and the first POS terminal 2A are communicatively coupled, and the printer 1 and the second POS terminal 2B are not communicatively coupled.

The first POS terminal 2A corresponds to a first terminal, and the second POS terminal 2B corresponds to a second terminal. In the following description, when the first POS terminal 2A and the second POS terminal 2B are not distinguished from each other, they are collectively referred to as a POS terminal 2. The POS terminal 2 corresponds to a terminal.

The first POS terminal 2A is provided with a first POS terminal touch panel 23A in a display area formed on a front surface, is a tablet computer configured to receive various inputs by touch operation, and operates a web browser. The first POS terminal 2A functions as a terminal used by a register clerk in charge of accounting in the register counter L by being communicatively coupled to the printer 1 and provides a user interface to the register clerk at a time of accounting at the register counter L.

The second POS terminal 2B is a tablet computer similar to the first POS terminal 2A.

Communicative coupling between the POS terminal 2 and the printer 1 corresponds to coupling between the POS terminal 2 and the printer 1.

The printer 1 is a device which accommodates roll paper, which is one aspect of a printing medium, and forms a dot on the accommodated roll paper with a line-type thermal printing head to print a character, an image, or the like. Although a printing method of the printer 1 according to the present embodiment exemplifies a thermal method, the printing method of the printer 1 is not limited to the thermal method, and may be another printing method such as an ink jet method. Further, the printing head of the printer 1 is not limited to the line type, and may be a serial type.

The printer 1 is coupled to at least one of the barcode reader 41, the cash changer 42, and the card reader 43. Each of the barcode reader 41, the cash changer 42, and the card reader 43 will be described later. The barcode reader 41 corresponds to a barcode reader.

Figure 2:
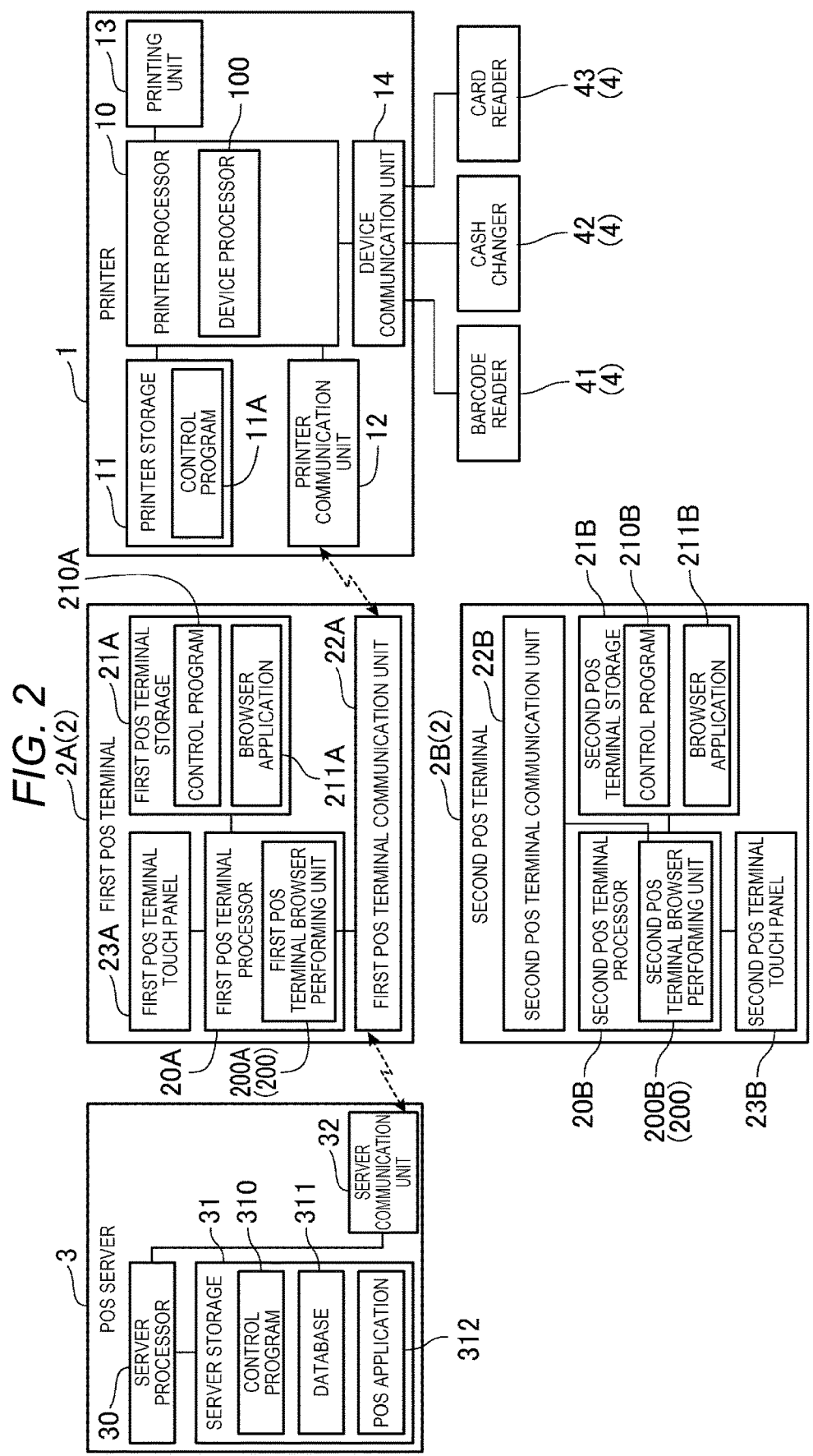
FIG. 2 is a diagram showing a configuration of a printer, a POS terminal, and a POS server.

FIG. 2 is a diagram showing configurations of the printer 1, the first POS terminal 2A, the second POS terminal 2B, and a POS server 3. FIG. 2 shows the case where the first POS terminal 2A is communicatively coupled to the printer 1 similar to FIG. 1.

First, the configuration of the printer 1 will be described.

The printer 1 includes a printer processor 10, a printer storage 11, a printer communication unit 12, a printing unit 13, and a device communication unit 14. The printing unit 13 corresponds to a printing head. The printer communication unit 12 corresponds to a second connector (port). The device communication unit 14 corresponds to a first connector.

The printer processor 10 includes a processor such as a CPU and other peripheral circuits as hardware. The printer storage 11 includes a memory such as a ROM which stores a control program 11A such as firmware and various data in a non-volatile manner, and a RAM which functions as a work area of a processor. In FIG. 2, illustration of the hardware is omitted. A processor provided in the printer processor 10 reads the control program 11A stored in the ROM of the printer storage 11 to perform processing. In this manner, the printer processor 10 performs processing by cooperation of hardware and software.

The printer processor 10 includes a device processor 100 as a functional block. The device processor 100 corresponds to a processor. A functional block of the printer processor 10 is shown for convenience such that a function which is realized by a processor such as the CPU performing arithmetic processing according to the control program 11A is shown as a block, and specific application software and hardware are not shown. Details of the device processor 100 will be described later.

The printer storage 11 is constituted with a memory device which stores the control program 11A and other various data in a non-volatile manner. The printer storage 11 may be constituted with the ROM which constitutes the printer processor 10, or may be constituted with the memory device other than the ROM. Further, the printer storage 11 may include the RAM which constitutes the printer processor 10.

The printer communication unit 12 includes communication hardware which performs wireless communication such as a network card in accordance with a predetermined communication standard, and wirelessly communicates with the POS terminal 2 by control of the printer processor 10. As the communication hardware, a communication circuit, a communication port, a communication board, a communication connector, or the like may be mentioned. Further, as the communication standard used by the printer communication unit 12 for communication, HTTP, WebSocket, or the like may be mentioned.

The printing unit 13 includes a transport mechanism transporting the roll paper, a printing mechanism printing the character, the image, or the like on the roll paper such as the printing head, a cutting mechanism cutting the roll paper, or the like. The printing unit 13 can issue a receipt by printing the image relating to the receipt on the roll paper and then cutting the roll paper at a predetermined position under the control of the printer processor 10.

The device communication unit 14 includes communication hardware such as a connector or an interface circuit, a communication port, a communication board in accordance with a serial communication standard such as USB, a parallel communication standard, a communication standard related to a wired LAN such as Ethernet, a communication standard related to wireless communication such as Bluetooth, or the like. The device communication unit 14 communicates with the device 4 coupled to the printer 1 under the control of the printer processor 10. Ethernet is a registered trademark. Further, Bluetooth is a registered trademark.

The barcode reader 41, the cash changer 42, and the card reader 43 are coupled to the printer 1.

The barcode reader 41 reads a barcode attached to a product, a product package, or the like, and inputs barcode data indicating a reading result to the device communication unit 14. The device communication unit 14 outputs the barcode data inputted from the barcode reader 41 to the printer processor 10.

The cash changer 42 is a device which accommodates paper currency, coins, a cash voucher, or the like, and performs depositing of a deposit, a withdrawal of change, or the like.

The card reader 43 magnetically reads information recorded on a magnetic card type recording medium such as a credit card or a membership card, and inputs card data indicating a reading result to the device communication unit 14. The device communication unit 14 outputs the card data inputted from the card reader 43 to the printer processor 10.

Next, the configuration of the first POS terminal 2A will be described.

The first POS terminal 2A includes a first POS terminal processor 20A, a first POS terminal storage 21A, a first POS terminal communication unit 22A, and a first POS terminal touch panel 23A.

The first POS terminal processor 20A includes the processor such as the CPU and other peripheral circuits as hardware. The first POS terminal storage 21A includes a memory such as a ROM which stores a control program 210A such as an application program and various data in a non-volatile manner, and a RAM which functions as a work area of the processor. In FIG. 2, the illustration of the hardware is omitted. The processor of the first POS terminal processor 20A reads the control program 210A stored in the ROM and the program and data stored in the RAM of the first POS terminal storage 21A, to perform processing. In this manner, the first POS terminal processor 20A performs processing by cooperation of hardware and software.

The first POS terminal processor 20A includes a first POS terminal browser performing unit 200A as a functional block. The first POS terminal browser performing unit 200A is a functional unit which causes the first POS terminal processor 20A to realize a function of the web browser as the processor of the first POS terminal processor 20A reads and performs a browser application 211A.

The first POS terminal browser performing unit 200A reads and performs a web browser stored in the first POS terminal storage 21A. A web page written in a markup language such as HTML or a script language is downloaded from the POS server 3 to the first POS terminal storage 21A by a function of the web browser. Data of the downloaded web page is stored, for example, in a RAM (not shown). The first POS terminal browser performing unit 200A reads the data of the downloaded web page, generates display data displaying the web page, and outputs the display data to the first POS terminal touch panel 23A. The first POS terminal touch panel 23A displays an image of the web page related to the input display data. In particular, the first POS terminal touch panel 23A displays an image of a web page related to a user interface provided to the register clerk at a time of accounting.

In addition, when the first POS terminal touch panel 23A detects a touch operation, the first POS terminal browser performing unit 200A specifies input content based on coordinate data of the display area of the first POS terminal touch panel 23A corresponding to the touch operation, and display data outputted on the first POS terminal touch panel 23A. The first POS terminal browser performing unit 200A accordingly performs appropriate processing, for example, by a function of a script, based on the specified input content.

The first POS terminal storage 21A is constituted with a memory device which stores the control program 210A, the browser application 211A, and other various data in a non-volatile manner. The first POS terminal storage 21A may be constituted with a ROM constituting the first POS terminal processor 20A, and may be constituted with a memory device other than the ROM. Further, the first POS terminal storage 21A may include a RAM constituting the first POS terminal processor 20A. The browser application 211A is a web browser application program in order to cause the first POS terminal processor 20A to function as the first POS terminal browser performing unit 200A. The browser application 211A is installed in advance on the first POS terminal 2A.

The first POS terminal communication unit 22A includes the communication hardware which performs wireless communication such as the network card according to the predetermined communication standard, and wirelessly communicates with the printer 1 and the POS server 3 by control of the first POS terminal processor 20A. As the communication hardware, for example, the communication circuit, the communication port, the communication board, the communication connector, or the like may be mentioned. Further, as the communication standard used by the first POS terminal communication unit 22A for communication, HTTP, WebSocket, or the like may be mentioned, for example.

The first POS terminal touch panel 23A includes a display panel such as a liquid crystal display panel, and a touch sensor provided on the display panel in an overlapping manner or in an integrated manner. The display panel displays various images, various screens, or the like under the control of the first POS terminal processor 20A. The touch sensor detects the touch operation and outputs the touch operation to the first POS terminal processor 20A. The first POS terminal processor 20A performs processing corresponding to the touch operation based on input from the touch sensor.

Next, the second POS terminal 2B will be described.

The second POS terminal 2B includes a second POS terminal processor 20B, a second POS terminal storage 21B, a second POS terminal communication unit 22B, and a second POS terminal touch panel 23B.

The second POS terminal processor 20B is constituted in the same manner as the first POS terminal processor 20A, and a processor provided therewith reads a control program 210B stored in the ROM and a program and data stored in the RAM of the second POS terminal storage 21B, to perform processing. In this manner, the second POS terminal processor 20B performs processing by cooperation of hardware and software.

The second POS terminal processor 20B includes a second POS terminal browser performing unit 200B as a functional block. The second POS terminal browser performing unit 200B is a functional unit which causes the second POS terminal processor 20B to realize the function of the web browser as the processor of the second POS terminal processor 20B reads and performs the browser application 211B. The second POS terminal browser performing unit 200B performs the same function as the first POS terminal browser performing unit 200A.

Similar to the first POS terminal storage 21A, the second POS terminal storage 21B is constituted with a memory device which stores the control program 210B, the browser application 211B, and other various data in a non-volatile manner. The browser application 211B is an application program in order to cause the second POS terminal processor 20B to function as the second POS terminal browser performing unit 200B. The browser application 211B is installed in advance on the second POS terminal 2B.

Similar to the first POS terminal communication unit 22A, the second POS terminal communication unit 22B includes communication hardware which performs wireless communication such as the network card according to the predetermined communication standard, and wirelessly communicates with the printer 1 and the POS server 3 by control of the second POS terminal processor 20B.

Similar to the first POS terminal touch panel 23A, the second POS terminal touch panel 23B includes the display panel such as the liquid crystal display panel, and the touch sensor provided on the display panel in an overlapping manner or in an integrated manner.

Next, the POS server 3 will be described.

The POS server 3 includes a server storage 31 storing a database 311 or the like which stores information related to products, manages sales, and manages inventory, and is a server device which uses the database 311 to manage the entire POS system 1000.

The POS server 3 includes a server processor 30, a server storage 31, and a server communication unit 32.

The server processor 30 includes a processor such as a CPU and other peripheral circuits as hardware. The server storage 31 includes the memory such as the ROM which stores the control program 210A such as an application program and various data in a non-volatile manner, and the RAM which functions as the work area of the processor. The processor of the server processor 30 reads a control program 310 stored in the ROM and a program or data stored in the RAM of the server storage 31, to perform processing. In this manner, the server processor 30 performs processing by cooperation of hardware and software.

The server storage 31 is constituted with a memory device which stores the control program 310, the database 311, a POS application 312, and various data in a non-volatile manner. The POS application 312 is a POS application program in order to cause the first POS terminal processor 20A and the second POS terminal processor 20B to perform a function described later. The POS application 312 is installed on the POS server 3 in advance.

The server communication unit 32 includes communication hardware which performs wireless communication such as the network card in accordance with the predetermined communication standard, and wirelessly communicates with the POS terminal 2 by the control of the server processor 30. As the communication hardware, for example, the communication circuit, the communication port, the communication board, the communication connector, or the like may be mentioned.

As described above, the POS application 312 is installed in the POS server 3 in advance. The first POS terminal browser performing unit 200A and the second POS terminal browser performing unit 200B use a function of the POS application 312 installed in the POS server 3 to perform various processing. In the following description, when the first POS terminal browser performing unit 200A and the second POS terminal browser performing unit 200B are not distinguished from each other, they are collectively referred to as the POS terminal browser performing unit 200.

The POS terminal browser performing unit 200 accordingly requests the POS server 3 to perform arithmetic processing, causes the server processor 30 to perform the arithmetic processing by the function of the POS application 312, receives a result of the arithmetic processing, and performs appropriate processing. For example, the first POS terminal browser performing unit 200A transmits the barcode data indicating a reading result of the barcode reader 41 to the POS server 3. The server processor 30 acquires information about an item corresponding to the barcode data from the database 311 by the function of the POS application 312, and transmits the information on the acquired item to the first POS terminal 2A. The first POS terminal browser performing unit 200A causes the information about the acquired item to be displayed on the first POS terminal touch panel 23A, and presents the information about the item to the register clerk. Further, the first POS terminal browser performing unit 200A requests the POS server 3 to calculate a total amount of accounting. The server processor 30 calculates the total amount of money by the function of the POS application 312, and transmits the calculation result to the first POS terminal 2A. If the first POS terminal browser performing unit 200A receives the calculation result, the first POS terminal browser performing unit 200A controls the printer 1 to issue a receipt on which information including the total amount is printed.

Figure 3:
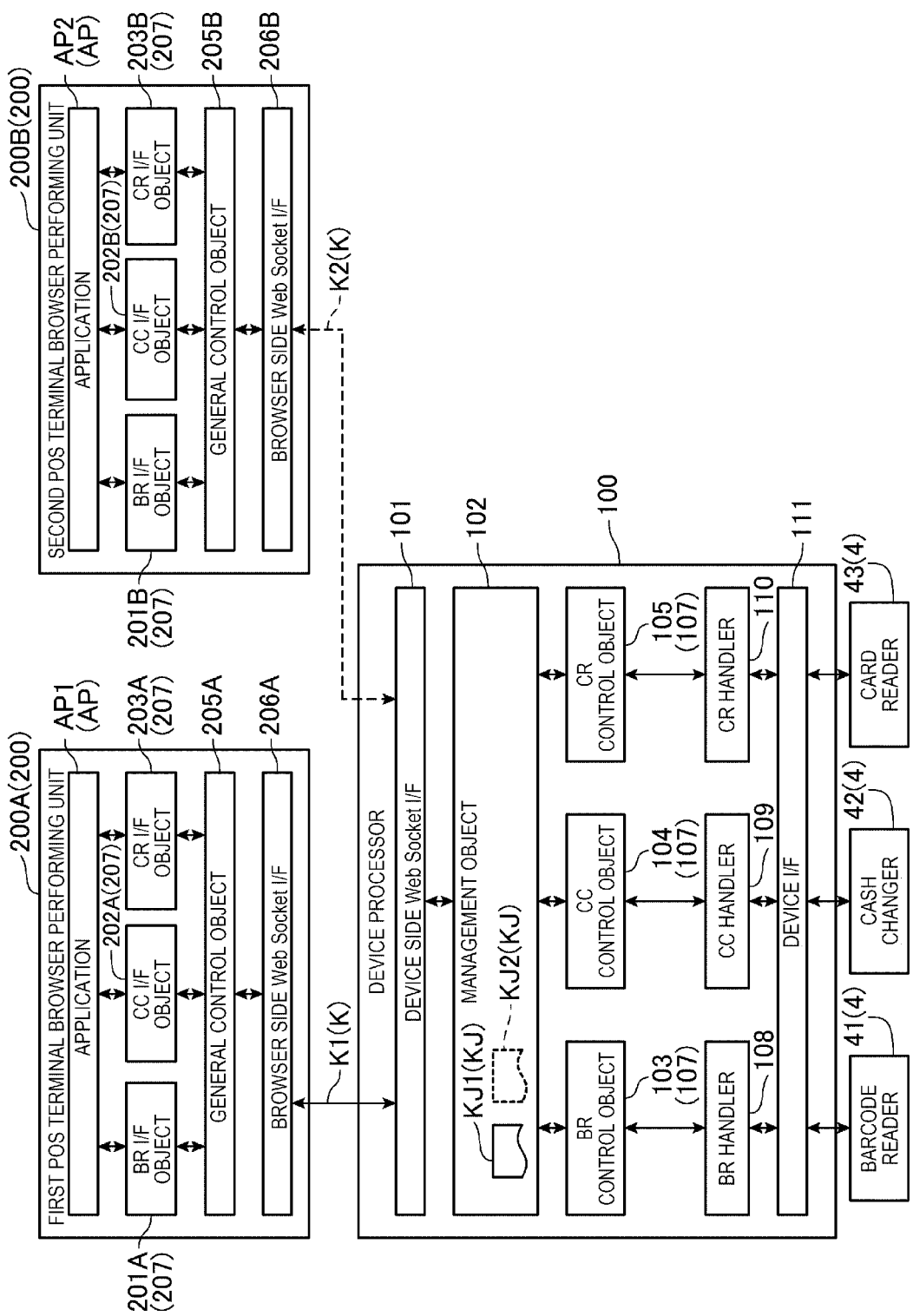
FIG. 3 is a functional block diagram of a POS terminal browser performing unit and a device processor.

FIG. 3 is a diagram showing a functional block diagram of the first POS terminal browser performing unit 200A, the second POS terminal browser performing unit 200B, and the device processor 100 in more detail. FIG. 3 shows a case where the first POS terminal 2A and the printer 1 are communicatively coupled, and a bi-directional communication state is established between the first POS terminal browser performing unit 200A and the device processor 100.

In FIG. 3, for convenience of explanation, a program itself, a software object, a block schematically representing a function realized by the program, a physical device such as a device and the like are represented at the same level.

In the present embodiment, "object" means an instance in object-oriented programming, that is, a software-based object defined as a set of data and a method. However, the "object" is not limited to the instance in the object-oriented programming, and may be a software-based object which can realize some function.

As shown in FIG. 3, an application AP1 operates in the first POS terminal browser performing unit 200A. The application AP1 operates on another apparatus such as the POS application 312, or may be an application downloaded from the other apparatus, a script implemented in an HTML file read by the first POS terminal browser performing unit 200A, and others such as a program and software where the first POS terminal browser performing unit 200A can use the function thereof.

In the first POS terminal browser performing unit 200A, at least one of a barcode reader interface object 201A, a cash changer interface object 202A, and a card reader interface object 203A is configured to operate. In the following description and in the drawings, an interface is abbreviated as I/F. Further, the first POS terminal browser performing unit 200A can operate a general control object 205A and a browser side WebSocket I/F 206A.

Further, as shown in FIG. 3, in the second POS terminal browser performing unit 200B, an application AP2 operates. The application AP2 is similar to the application AP1.

In the second POS terminal browser performing unit 200B, at least one of a barcode reader I/F object 201B, a cash changer I/F object 202B, and a card reader I/F object 203B is configured to operate. In addition, the second POS terminal browser performing unit 200B can operate a general control object 205B and a browser side WebSocket I/F 206B.

In the following description and in the drawings, the barcode reader I/F objects 201A and 201B are abbreviated as the BR I/F objects 201A and 201B, the cash changer I/F objects 202A and 202B are abbreviated as CC I/F objects 202A and 202B, and the card reader I/F objects 203A and 203B are abbreviated as the CR I/F objects 203A and 203B.

Hereinafter, when the applications AP1 and AP2 are not distinguished from each other, they are collectively referred to as an application AP. When the BR I/F objects 201A and 201B, the CC I/F objects 202A and 202B, and the CR I/F objects 203A and 203B are not distinguished from one another, respectively, they are collectively referred to as an I/F object 207.

In the device processor 100, at least one of a device side WebSocket I/F 101, a management object 102, a barcode reader control object 103, a cash changer control object 104, and a card reader control object 105 is configured to operate.

In the following description and the figure, the barcode reader control object 103 is abbreviated as the BR control object 103, the cash changer control object 104 is abbreviated as the CC control object 104, and the card reader control object 105 is abbreviated as the CR control object 105.

Each of the BR control object 103, the CC control object 104, and the CR control object 105 corresponds to a control object. When the BR control object 103, the CC control object 104, and the CR control object 105 are not distinguished from one another, they are collectively referred to as a control object 107.

Here, with reference to FIG. 4, generation and a function of the object and the software-based interface will be described.

Figure 4:
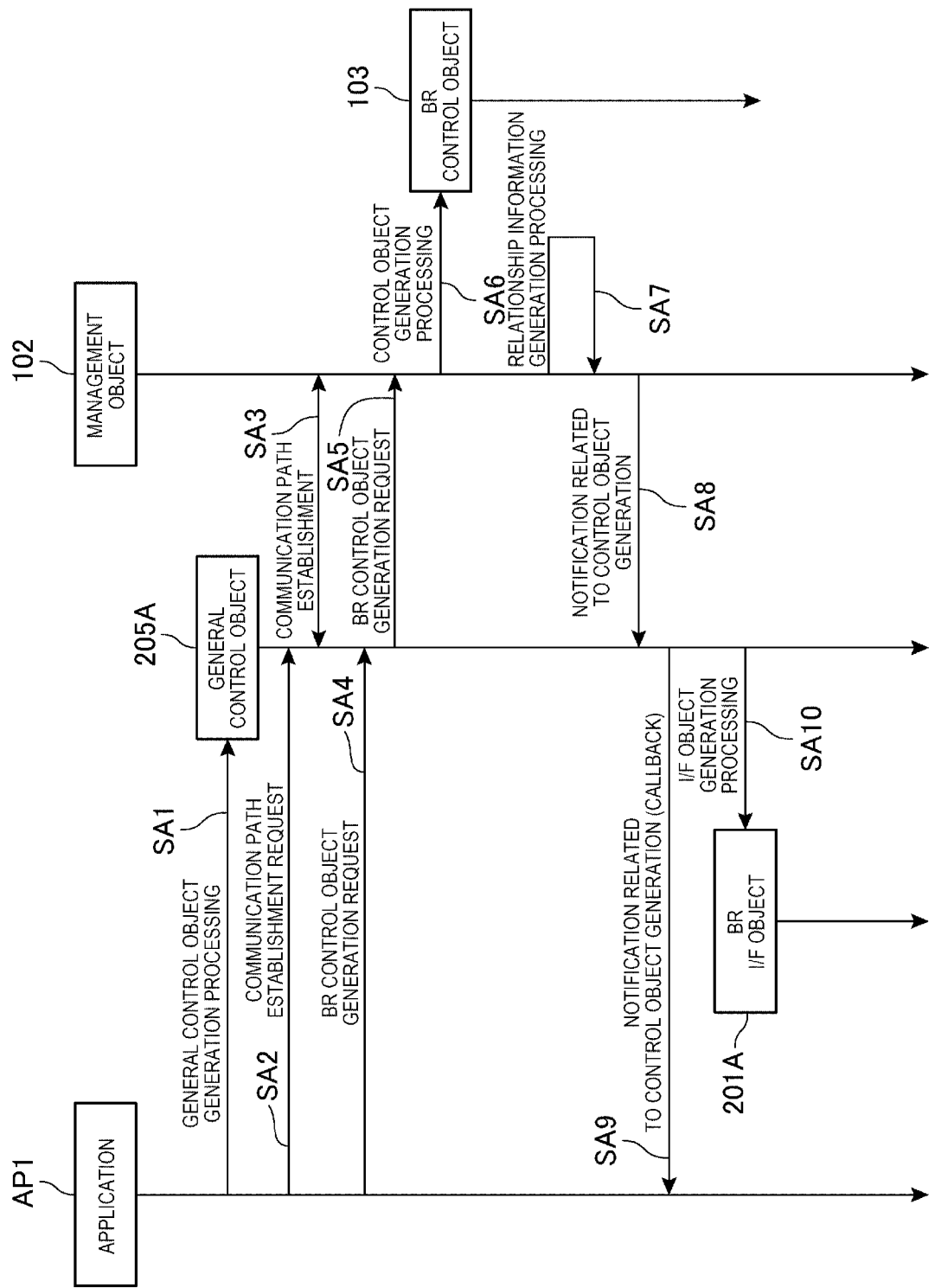
FIG. 4 is a flowchart showing an operation when control of a device is started.

FIG. 4 is a flowchart showing operations of the POS terminal browser performing unit 200 and the device processor 100 when control of the device 4 by the control object 107 starts.

In the description of FIG. 4, it is assumed that the control object 107 corresponding to the device 4 to be controlled by the POS terminal 2 is not generated.

Further, the flowchart shown in FIG. 4 shows, as an example, an operation when an object is generated between the first POS terminal browser performing unit 200A and the device processor 100. Further, the flowchart shown in FIG. 4 shows an example of generation of the BR I/F object 201A as the I/F object 207, and the BR control object 103 as an example of the control object 107, and operations when the objects are generated.

In the following description, when processing is described with the application as a subject of an operation, as in "the application does or is . . . ", it means that the processor constituting the first POS terminal processor 20A or the second POS terminal processor 20B reading and performing the application uses a function of the application to perform processing. Similarly, when processing is described with an object as a subject of an operation as "the object does or is . . . ", it means that the processor constituting the first POS terminal processor 20A, the second POS terminal processor 20B, or the printer processor 10 uses a function of the object and perform processing.

First, the application AP1 performs general control object generation processing (step SA1). The general control object generation processing is the processing of generating the general control object 205A. The general control objects 205A and 205B are objects which are implemented with various methods related to controlling of the POS system 1000, such as a method related to establishing and disconnecting a communication path and a method related to generating and deleting the control object 107 and the I/F object 207. It is an implemented object.

If the general control object 205A is generated by the processing of the step SA1, the application AP1 performs a communication path establishment request (step SA2). The communication path establishment request means a request which establishes a logical communication path K related to WebSocket between the POS terminal 2 and the printer 1, and establishes a state in which data transmission and reception in accordance with a WebSocket standard can be performed between the devices.

In response to the communication path establishment request in the step SA2, the general control object 205A and the management object 102 cooperate with each other in accordance with the WebSocket standard to establish a connection and the communication path K1, between the browser side WebSocket I/F 206A and the device side WebSocket I/F 101 (step SA3). Thus, a state in which bidirectional communication can be asynchronously performed is established between the POS terminal 2A and the printer 1. With an establishment of the communication path K1, communication path identification information, which is information identifying the communication path K1, is given to the communication path K1 by a function of the general control object 205A or the management object 102. The assigned communication path identification information is stored in a predetermined storage area of the first POS terminal storage 21A in a manner where the communication path identification information can be referred to by the application AP1 in the first POS terminal 2A, and is stored in a predetermined storage area in the printer storage 11 in a manner where the communication path identification information can be referred to by the management object 102 in the printer 1.

Each of the browser side WebSocket I/F 206A and the device side WebSocket I/F 101 is a functional block related to an interface of software which transmits and receives data in accordance with the WebSocket standard. Further, in the management object 102, a method related to various processing described later is implemented in addition to the communication path K1 described above and in addition to a method related to establishment processing of a communication path K2. The communication path K2 is a communication path between the browser side WebSocket I/F 206B of the second POS terminal browser performing unit 200B and the device side WebSocket I/F 101, and is conveniently shown by a dotted line in FIG. 3 because the communication path K2 is not established.

Next, the application AP1 performs a BR control object generation request (step SA4). The BR control object generation request is processing which requests generation of the BR control object 103 operating on the device processor 100. In the step SA4, the application AP1 transmits a generation request command requesting the generation of the BR control object 103 to the management object 102 by the general control object 205A. Generation of the control object 107 including the BR control object 103 enables control of the device 4 corresponding to the control object 107 by the POS terminal 2. Therefore, processing of the step SA4 corresponds to processing of "a request with respect to the device 4".

Here, identification information is allocated to the respective devices 4 coupled to the printer 1 for every type of the device 4. When generating the BR control object 103, the application AP1 designates identification information of the barcode reader 41 which is the device 4 corresponding to the BR control object 103. As a result, the management object 102 can generate the appropriate control object 107 corresponding to the device 4 to be generated, using the designated identification information as a key.

Here, the control object 107 will be described.

The control object 107 is an object in which various methods related to the control of the device 4 are implemented, and controls the corresponding device 4 using a function of a corresponding handler. For example, in the BR control object 103, a method performing processing related to control of the barcode reader 41 is implemented. The BR control object 103 controls the barcode reader 41 using a function of a BR handler 108. A handler is a function or a subroutine which performs processing related to the corresponding the device 4 in response to a request. For example, when the barcode reader 41 performs barcode reading, the BR (barcode reader) handler 108 receives input of the barcode data indicating a reading result via a device I/F 111 which is an interface with the device 4. Then, the BR handler 108 performs interrupt processing and passes the barcode data to the BR control object 103. The same applies to other CC (cash changer) handlers 109 and CR (card reader) handlers 110.

In response to the BR control object generation request from the application AP1, the general control object 205A requests the management object 102 to generate a BR control object via the communication path K1 (step SA5). In response to the request, the management object 102 generates the BR control object 103 corresponding to the specified identification information, for example, by a new statement (step SA6).

When the generation of the BR control object 103 is completed, the management object 102 performs relationship information generation processing (step SA7).

The relationship information generation processing is processing which generates relationship information KJ indicating a relationship between the POS terminal 2 being communicatively coupled to the printer communication unit 12 via the establishment of the communication path K in the step SA3, and the control object 107 controlling the device 4.

The relationship information KJ is, for example, information in which identification information identifying the control object 107 corresponding to the device 4 to be controlled by the POS terminal 2 is associated with identification information identifying the POS terminal 2. That is, the relationship information KJ of the configuration is information indicating correspondence relationship between the POS terminal 2 and the control object 107 corresponding to the device 4 to be controlled by the POS terminal 2. The identification information of the control object 107 is set in advance for every control object 107, and is stored in advance in the printer storage 11. As the identification information identifying the POS terminal 2, identification information related to communication between the POS terminal 2 and the printer 1 is adopted. As the identification information related to the communication between the POS terminal 2 and the printer 1, the communication path identification information given in the step SA3, a predetermined address according to the communication standard of wireless communication performed between the POS terminal 2 and the printer 1, or the like can be mentioned as an example.

Further, for example, the relationship information KJ is information in which the identification information identifying the POS terminal 2 is associated with the information indicating that the device 4 is under control by the POS terminal 2. That is, the relationship information KJ of the configuration is information indicating use relationship where the POS terminal 2 uses the control object 107 corresponding to the device 4 to be controlled by the POS terminal 2. As information indicating that the control of the device 4 is in progress, a flag indicating that control is in progress can be mentioned as an example.

The management object 102 generates first relationship information KJ1 indicating the relationship between the POS terminal 2A and the BR control object 103 in the relationship information generation processing of the step SA7. The first relationship information KJ1 corresponds to first information. In FIG. 3, second relationship information KJ2 indicating a relationship between the POS terminal 2B and the BR control object 103 is shown together with the first relationship information KJ1 by a dotted line. The dotted line is illustrated in FIG. 3 for the sake of convenience to show that the second relationship information KJ2 is not generated by the management object 102 because the communication path K2 is not established in FIG. 3. The second relationship information KJ2 corresponds to second information.

In this manner, the management object 102 manages the relationship between the POS terminal 2 and the control object 107 by generating the relationship information KJ. The management is similarly performed when other control object 107 is generated. Thus, by generating the relationship information KJ, the management object 102 can appropriately grasp which POS terminal 2 controls the device 4 corresponding to the control object 107, for the respective control objects 107.

When the generation of the BR control object 103 is completed, the management object 102 notifies the general control object 205A that the generation of the BR control object 103 is completed via the communication path K1 (step SA8). Further, the general control object 205A sends the notification to the application AP1 (step SA9). In addition, at the time of the BR control object generation processing of the step SA4, a callback which receives a processing result of the processing related to the generation of the control object 107 is specified, and by performing a callback function, a notification that the generation of the BR control object 103 succeeded is sent to the application AP1.

Next, the general control object 205A generates the BR I/F object 201A in association with the BR control object 103 for which generation is completed (step SA10).

Here, the I/F object 207 will be described.

The I/F object 207 has a function as an interface which causes the application AP to use a method implemented in the control object 107 related to the corresponding device 4 when controlling the device 4 by the application AP. That is, if the application AP outputs information to the I/F object 207 corresponding to one device 4 when controlling the one device 4, the I/F object 207 communicates with the control object 107 corresponding to the one device 4 and performs the method implemented in the control object 107, so that control of the one device 4 can be realized.

The generation of the I/F object 207 enables the application AP to use the method of the control object 107 via the I/F object 207 and to control the device 4. That is, the generation of the I/F object 207 accompanying the generation of the control object 107 enables the control of the device 4 by the control object 107 with respect to the POS terminal 2.

As described above, the generation of the BR control object 103 and the BR I/F object 201A is completed. Further, for the other devices 4 as well, when the corresponding control object 107 is not generated, the control object 107 and the I/F object 207 are similarly generated. When the control of the device 4 via the printer 1 with respect to the POS terminal 2B is also enabled, the control object 107 and the I/F object 207 are similarly generated when the control object 107 corresponding to the device 4 to be controlled by the POS terminal 2B is not generated.

As the control of the device 4 by the POS terminal 2, the following processing is mentioned as an example.

That is, when the barcode reader 41 can be controlled by the BR control object 103 with respect to the POS terminal 2A, the processing is that the POS terminal 2A acquires the barcode data from the barcode reader 41 by the BR control object 103. In the processing, the BR control object 103 outputs the barcode data acquired from the BR handler 108 to the management object 102. The management object 102 outputs the barcode data to the POS terminal 2A related to the BR control object 103 shown by the first relationship information KJ1 based on the first relationship information KJ1. The application AP1 acquires the barcode data outputted from the management object 102 by the general control object 205A.

FIG. 3 illustrates the control object 107 controlling the device 4. However, for example, when the POS terminal 2A causes the printing unit 13 to issue a receipt, the device processor 100 may treat the printing unit 13 as a device, and the POS terminal 2A may cause the printing unit 13 to issue the receipt. In the configuration, a print control object which controls the printing unit 13 is operable in the device processor 100. Further, in the POS terminal 2A, a print I/F object which is an I/F object corresponding to the print control object is operable.

For example, when the POS terminal 2A causes the printing unit 13 to issue the receipt, the application AP1 generates an image to be printed on the receipt by the implemented function, and generates an XML document composed in a markup language containing information related to the receipt to be issued by the printing unit 13 based on the generated image. The XML document can be converted by the device processor 100 into a control command in accordance with a command system of the printing unit 13. The application AP outputs data, which at least includes identification information of the printing unit 13, information requesting generation of information specifying a function to be performed by the print control object which controls the printing unit 13, and the generated XML document, to the print I/F object. Next, the print I/F object requests the general control object 205A to output the data inputted from the application AP1 to the print control object. The general control object 205A outputs the data to the management object 102 via the communication path K1, and the management object 102 outputs the data to the print control object. The print control object performs data shaping and data conversion so that the printing unit 13 can process the XML file included in the input data by performing a specified function in the input data, and then generates a control command in accordance with the command system of the printing unit 13 and outputs the control command to the printing unit 13. The printing unit 13 operates various mechanisms based on the input control command to issue a receipt.

Next, with reference to the flowchart of FIG. 5, an operation at the time of ending the control of the device 4 by the control object 107 will be described.

Figure 5:
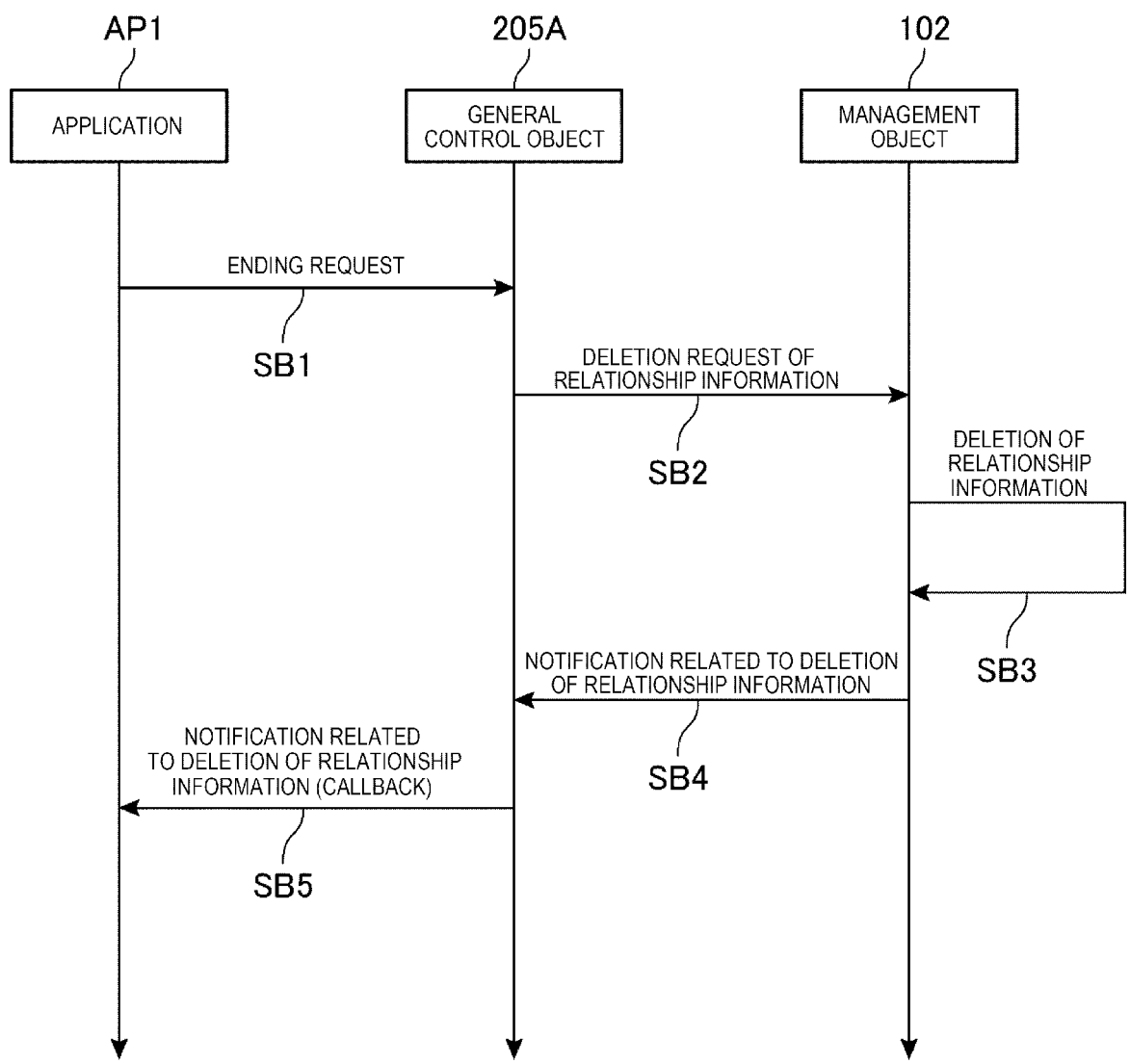
FIG. 5 is a flowchart showing an operation when control of the device is ended.

FIG. 5 is a flowchart showing operations of the POS terminal browser performing unit 200 and the device processor 100 when the control of the device 4 by the control object 107 is ended.

The flowchart shown in FIG. 5 shows, as an example, an operation when the control of the device 4 by the control object 107 generated between the first POS terminal browser performing unit 200A and the device processor 100 is ended. Further, in the flowchart shown in FIG. 5, the barcode reader 41 is exemplified as the device 4 of which control is ended.

First, the application AP1 performs an ending request indicating a request for ending of the control of the barcode reader 41 by the BR control object 103 (step SB1). When performing the ending request, the application AP1 specifies the identification information of the barcode reader 41. The ending request is performed by the application AP1 performing a method implemented in the general control object 205A.

In response to the ending request of the BR control object 103 by the application AP1, the general control object 205A performs a deletion request of the first relationship information KJ1 to the management object 102 via the communication path K1 (step SB2).

In response to the deletion request, the management object 102 deletes the first relationship information KJ1 (step SB3). In the step SB3, the management object 102 deletes the first relationship information KJ1, but does not delete the BR control object 103.

When the deletion of the first relationship information KJ1 is completed, the management object 102 notifies the general control object 205A that the deletion of the first relationship information KJ1 is completed via the communication path K1 (step SB4). Further, the general control object 205A sends the notification to the application AP1 (step SB5).

At the time of the processing of the step SB1, a callback receiving a processing result of processing related to the ending request is specified, and by performing a callback function, a notification that the processing related to the ending request succeeded is sent to the application AP1.

In this manner, when the control of the barcode reader 41 by the BR control object 103 is ended, the management object 102 deletes the first relationship information KJ1, but does not delete the BR control object 103. Therefore, if the control of the barcode reader 41 is ended, the BR control object 103 remains. Since the management object 102 does not delete the BR control object 103 but deletes the first relationship information KJ1, it is possible to cancel the controllable state of the barcode reader 41 by the BR control object 103 with respect to the POS terminal 2A.

As the control of the barcode reader 41 by the BR control object 103 ends, the general control object 205A operating on the POS terminal 2A may or may not delete the BR I/F object 201A. Further, the general control object 205A and the management object 102 cooperate with each other and may disconnect or may not delete the communication path K1 established between the browser side WebSocket I/F 206A and the device side WebSocket I/F 101 in accordance with the WebSocket standard.

As described above, the control of the barcode reader 41 by the BR control object 103 ends. As for the other devices 4, the control of the device 4 is ended by deleting the relationship information KJ while not deleting the corresponding control object 107, in the same manner. Further, the same applies to the case where the control of the device 4 by the control object 107 is ended with respect to the POS terminal 2B.

As described above, in the configuration in which the control of the device 4 can be started and ended by the control object 107, the printer 1 according to the present embodiment can quickly switch the POS terminal 2 which controls the device 4 to another POS terminal 2 by performing the following operation.

Figure 6:
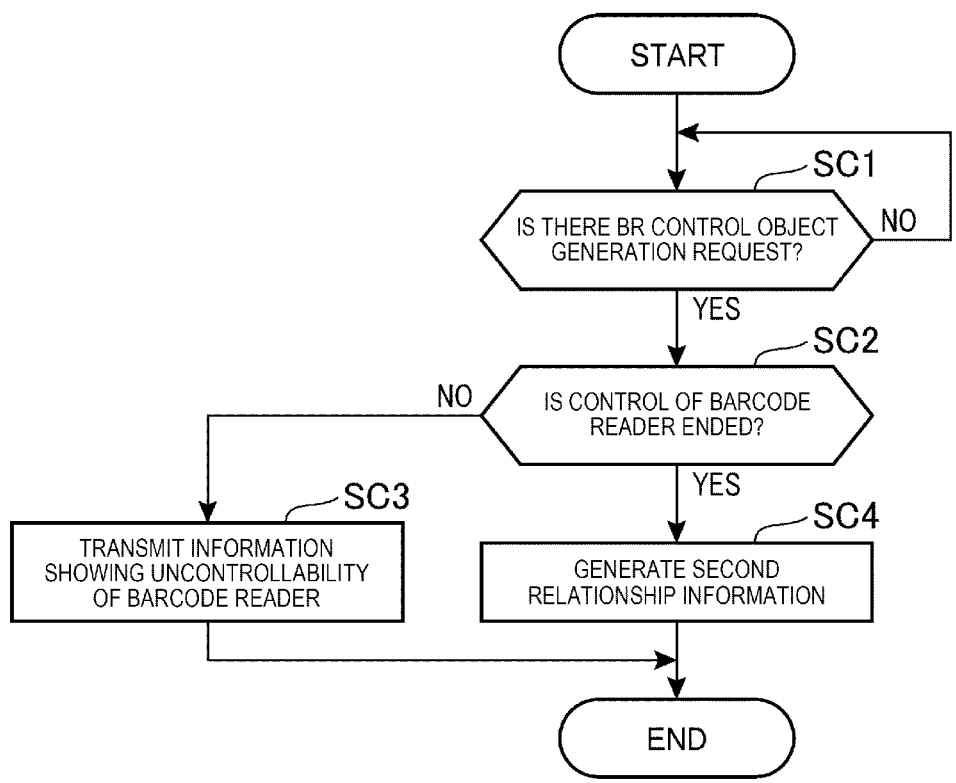
FIG. 6 is a flowchart showing an operation of the printer.

FIG. 6 is a flowchart showing an operation of the printer 1. In particular, FIG. 6 shows an operation of the device processor 100.

In FIG. 6, a case where the POS terminal 2 which controls a certain device 4 is switched from the first POS terminal 2A to the second POS terminal 2B will be described. Further, in FIG. 6, the device 4 to be controlled by the POS terminal 2 to be switched is described as the barcode reader 41.

At the start of an operation of FIG. 6, it is assumed that the BR control object 103 is generated regardless of whether or not the control of the barcode reader 41 by the POS terminal 2A is ended.

The management object 102 of the device processor 100 determines whether or not there is a BR control object generation request from the general control object 205B of the second POS terminal browser performing unit 200B (step SC1).

When the management object 102 determines that there is not the BR control object generation request (step SC1: NO), the management object 102 performs processing of the step SC1 again. On the other hand, when the management object 102 determines that there is the BR control object generation request from the second POS terminal browser performing unit 200B (step SC1: YES), the management object 102 determines whether or not the control of the barcode reader 41 by the POS terminal 2A is ended (step SC2).

When there is the BR control object generation request from the second POS terminal browser performing unit 200B, the management object 102 determines whether or not the relationship information KJ indicating a relationship with the BR control object 103 is deleted. That is, the management object 102 determines whether or not the first relationship information KJ1 is deleted. When the management object 102 determines that the first relationship information KJ1 is not deleted, the management object 102 determines that the control of the barcode reader 41 by the POS terminal 2A is not ended. On the other hand, when the management object 102 determines that the first relationship information KJ1 is deleted, the management object 102 determines that the control of the barcode reader 41 by the POS terminal 2A is ended. It is possible to determine whether or not the control of the device 4 is ended based on whether or not the relationship information KJ is deleted as described above because a configuration is provided where the relationship information KJ is deleted when the control of the device 4 is ended as shown in FIG. 5.

When the management object 102 determines that the control of the barcode reader 41 by the POS terminal 2A is not ended (step SC2: NO), the management object 102 transmits information indicating that the barcode reader 41 cannot be controlled to the POS terminal 2B via the communication path K2. (step SC3).

As a result, the POS terminal 2B can display information indicating that the barcode reader 41 cannot be controlled on the second POS terminal touch panel 23B. Therefore, a user who wishes to switch the POS terminal 2 controlling the barcode reader 41 from the POS terminal 2A to the POS terminal 2B can recognize that switching to the POS terminal 2B cannot be performed, and can quickly take a measure against switching unavailability.

In the step SC3, the management object 102 further achieves the following effect by combining and transmitting information indicating a cause which makes the barcode reader 41 uncontrollable. When control of a certain device 4 is established from the control object 107 with respect to a certain POS terminal 2, the management object 102 according to the present embodiment performs exclusive processing so that another POS terminal 2 different from the certain POS terminal 2 does not perform the control of the certain device 4. This is, for example, to prevent the barcode data read by the barcode reader 41 from being unnecessarily outputted to the POS terminal 2 which is not suitable for acquiring the barcode data. Therefore, the reason that the barcode reader 41 cannot be controlled is that the control of the barcode reader 41 by the POS terminal 2A is not ended. When the POS terminal 2B receives the information indicating the cause and displays the cause on the second POS terminal touch panel 23B, the user who tries to switch from the POS terminal 2A to the POS terminal 2B can recognize that the cause preventing the switching is due to the fact that the control of the barcode reader 41 by the POS terminal 2A is not ended. As a result, the user who tries to switch from the POS terminal 2A to the POS terminal 2B can quickly take a measure against the cause, and can quickly switch the POS terminal 2 from the POS terminal 2A to the POS terminal 2B.

When the management object 102 determines that the control of the barcode reader 41 by the POS terminal 2A is ended (step SC2: YES), the processing of the step SA6 shown in FIG. 4 is skipped and the relationship information generation processing of the step SA7 is performed to generate the second relationship information KJ2 (step SC7). As a result, the management object 102 enables the control of the barcode reader 41 by the BR control object 103 with respect to the POS terminal 2B.

In related art, when the control of a certain device 4 by a certain POS terminal 2 is ended, the management object 102 may be configured to delete the control object 107 corresponding to the certain device 4. It is configured so that a certain device 4 can be reliably released from the control object 107 by deleting the control object 107 and the control of the certain device 4 can be reliably prevented from being occupied by a certain POS terminal 2. However, in the configuration, when the POS terminal 2 controlling a certain device 4 is switched, the control object 107 corresponding to the certain device 4 may need to be deleted and regenerated, which may take a long time to switch.

Therefore, as described above, when the control of the barcode reader 41 by the POS terminal 2A is ended, the management object 102 deletes the first relationship information KJ1, but does not delete the BR control object 103. Then, if the management object 102 receives the BR control object generation request from the POS terminal 2B after deleting the first relationship information KJ1, the management object 102 generates the second relationship information KJ2 and enables the control of the barcode reader 41 by the BR control object 103 with respect to the POS terminal 2B. When a control object is generated, it is necessary to establish a connection with the BR handler 108 for the barcode reader 41. At that time, initialization of the BR handler 108 is also required to start using the barcode reader 41. However, since there is no need to delete and regenerate the control object 107 and there is no need to connect with the BR handler 108 or to initialize the BR handler 108, the management object 102 can quickly switch the POS terminal 2 controlling the barcode reader 41 from the POS terminal 2A to the POS terminal 2B.

By quickly switching the POS terminal 2 which controls the barcode reader 41, the following effect can be obtained in the following manner, for example.

When the POS terminal 2 is assigned to every register clerk and a register clerk is replaced in a certain register counter L, the accounting system 2000 can quickly perform the accounting processing by the POS terminal 2 assigned to the register clerk who is replaced, and quickly issue a receipt based on the accounting processing performed by the POS terminal 2. Further, when the existing POS terminal 2 is replaced with the new POS terminal 2, the accounting system 2000 can quickly perform the accounting processing by the new POS terminal 2, and quickly issue a receipt based on the accounting processing performed by the POS terminal 2. That is, a change of the accounting system 2000 can be quickly performed.

Further, as described above, the first relationship information KJ1 is identification information related to communication between the first POS terminal 2A and the printer 1, or information indicating that the barcode reader 41 is under the control by the first POS terminal 2A. Further, the second relationship information KJ2 is identification information related to communication between the second POS terminal 2B and the printer 1, or information indicating that the barcode reader 41 is under the control by the second POS terminal 2B. That is, based on the relationship information KJ, the management object 102 can accurately grasp the POS terminal 2 which controls the barcode reader 41, and does not transmit the barcode data read by the barcode reader 41 to the erroneous POS terminal 2, for example.

Although the barcode reader 41 is described as an example of the device 4 in the description of FIG. 6, the same processing is performed on the other device 4. Further, even when the POS terminal 2 controlling the device 4 is switched from the second POS terminal 2B to the first POS terminal 2A, the same processing is performed.

In the above description, it was described such that as the control of the device 4 by the control object 107 ends, the general control object 205A or 205B operating on the POS terminal 2 may delete the I/F object 207 corresponding to the device 4 or may not delete the I/F object 207. However, when a certain POS terminal 2 switches with respect to a certain device 4 a plurality of times, as the control of the device 4 by the control object 107 ends, it is preferable to have a configuration where the general control object 205A or 205B does not delete the corresponding I/F object 207. As a result, whenever the control of a certain device 4 is performed, it is not necessary to delete and regenerate the I/F object 207, and switching can be performed more quickly. It is preferable that the communication path K established between the POS terminal 2 and the printer 1 is also configured not to be decoupled in the same situation.

As described above, the printer 1 includes the printing unit 13, the device communication unit 14 configured to be coupled to the device 4, the printer communication unit 12 configured to be coupled to the POS terminal 2 on which the web browser operates, and the device processor 100 which enables the control of the device 4 from the POS terminal 2 by the control object 107 based on the relationship information KJ indicating the relationship between the POS terminal 2 communicatively coupled to the printer communication unit 12 and the control object 107. If a request for the device 4 from the first POS terminal 2A is received, the device processor 100 generates the first relationship information KJ1 indicating the relationship between the first POS terminal 2A and the control object 107, and enables the control of the device 4 from the POS terminal 2A by the control object 107 based on the first relationship information KJ1. If the control of the device 4 by the first POS terminal 2A is ended, the device processor 100 deletes the first relationship information KJ1 while not deleting the control object 107, after deleting the first relationship information KJ1, generates the second relationship information KJ2 if a request for the device 4 from the second POS terminal 2B is received, and enables the control of the device 4 from the POS terminal 2B by the control object 107 based on the second relationship information KJ2.

According to the configuration, since it is not necessary to delete and regenerate the control object 107, the POS terminal 2 which controls the barcode reader 41 can be quickly switched from the POS terminal 2A to the POS terminal 2B.

When the device processor 100 receives a request for the device 4 from the second POS terminal 2B before deleting the first relationship information KJ1, the device processor 100 transmits information indicating that the control of the device 4 is not possible to the second POS terminal 2B.

According to the configuration, the POS terminal 2B can display the information indicating that the device 4 cannot be controlled on the second POS terminal touch panel 23B. Therefore, a user who wishes to switch the POS terminal 2 controlling the device 4 from the POS terminal 2A to the POS terminal 2B can recognize that the POS terminal 2 cannot be switched, and quickly take a measure against switching unavailability.

The first relationship information KJ1 includes identification information related to communication with the first POS terminal 2A or information indicating that the device 4 is under the control by the first POS terminal 2A. The second relationship information KJ2 includes identification information related to communication with the second POS terminal 2A or information indicating that the device 4 is under the control by the second POS terminal 2A.

According to the configuration, it is possible to accurately grasp the POS terminal 2 which controls the device 4 based on the relationship information KJ. Therefore, for example, the device processor 100 does not transmit the barcode data read by the barcode reader 41 to the erroneous POS terminal 2 which does not control the barcode reader 41.

The POS terminal 2 is a terminal which performs accounting processing based on the barcode data read by the barcode reader 41. The printer 1 issues the receipt by the printing unit 13 based on the accounting processing performed by the POS terminal 2.

According to the configuration, it is possible to quickly change the accounting system 2000 which performs the accounting processing and issues the receipt.

Each embodiment described above merely show one aspect of the present disclosure, and arbitrary modifications and applications are possible within the scope of the present disclosure.

For example, in the embodiment described above, the present disclosure is described by taking the case where the POS system 1000 is applied to the store T having the register counter L as an example, but the aspect of usage of the POS system is not limited to the example, and it is also possible to apply the POS system to for example, a food and drink store such as the tearoom and the restaurant. The same applies to the accounting system 2000.

Further, in the embodiment described above, for example, the tablet type POS terminal 2 is exemplified as the terminal, but a form of the POS terminal 2 is not limited to the tablet type, and may be, for example, a desktop type.

Further, for example, although the printer 1 and the POS server 3 are separate devices, the printer 1 may have a function of the POS server 3.

Further, for example, when the control method of the printer 1 described above is realized by using a computer included in the printer 1 or an external device coupled to the printer 1, an aspect of the present disclosure can be configured with a program performed by the computer in order to realize the control method, a recording medium which records the program in a computer-readable manner, or a transmission medium which transmits the program.

Further, the functions of the printer processor 10, the POS terminal processor 20A, the display terminal processor 20B, and the server processor 30 may be realized by a plurality of processors or semiconductor chips.

Further, each portion shown in FIG. 2 is an example, and a specific implementation form is not limited to a particular implementation. In other words, hardware corresponding to each portion does not need to be implemented, separately, and it is of course possible to realize a function of each portion, by one processor performing a program. Further, in the embodiment described above, a portion of the functions implemented by software may be implemented as hardware, or a portion of the functions implemented by hardware may be implemented by software. In addition, specific detailed configurations of other portions of the printer 1, the POS terminal 2, and the POS server 3 can also be arbitrarily changed within the scope without departing from the gist of the present disclosure.

Further, for example, the step unit of the operations shown in FIG. 4, FIG. 5, and FIG. 6 is divided according to a main processing content in order to facilitate the understanding of the operation of each portion of the POS terminal 2 and the printer 1, and the present disclosure is not limited by a method and a name of division of a processing unit. Depending on the processing content, it may be divided into more steps. Further, one step unit may be divided to include more processing. Further, the order of the steps may be changed as appropriate within the scope without departing from the gist of the present disclosure.

What is claimed is:

1. A printer comprising:

a printing head; and a processor configured to be coupled to an external device and a terminal on which a web browser operates, and enabling control of the external device from the terminal by a control object controlling the external device based on information indicating a relationship between the terminal and the control object, wherein the processor generates first information indicating a relationship between a first terminal and the control object when a request for the external device is received from the first terminal, and enables the control of the external device by the control object with respect to the first terminal based on the first information, the first information further includes information indicating whether control of the external device is in progress or ends, the processor deletes the first information while the control object is not deleted when the first information indicates that the control of the external device by the first terminal ends, generates second information indicating a relationship between a second terminal and the control object when a request for the external device from the second terminal is received after deleting the first information, and enables the control of the external device from the second terminal by the control object based on the second information.

2. The printer according to claim 1, wherein
the processor transmits information indicating that the external device is not controllable to the second terminal when a request for the external device is received from the second terminal before deleting the first information.

3. The printer according to claim 1, wherein
the first information includes identification information related to communication with the first terminal or information indicating that the external device is being controlled by the first terminal, and the second information includes identification information related to communication with the second terminal or information indicating that the external device is being controlled by the second terminal.

4. The printer according to claim 1, wherein
the external device is a barcode reader, the terminal is a POS terminal which performs accounting processing based on barcode data read by the barcode reader, and the printer prints a receipt based on the accounting processing performed by the POS terminal via the printing head.

5. A control method of a printer configured to be coupled to an external device and a terminal on which a web browser operates, comprising:

generating first information indicating a relationship between a first terminal and a control object controlling the external device when a request for the external device is received from the first terminal to enable control of the external device by the control object with respect to the first terminal based on the first information, the first information further including information indicating whether control of the external device is in progress or ends;

deleting the first information while the control object is not deleted when the first information indicates the control of the external device by the first terminal ends; and generating second information indicating a relationship between a second terminal and the control object when a request for the external device is received from the second terminal after the first information is deleted to enable the control of the external device from the second terminal by the control object based on the second information.

6. The control method of the printer according to claim 5, further comprising:

transmitting information indicating that the external device is not controllable to the second terminal when the request for the external device is received from the second terminal before deleting the first information.

7. The control method of the printer according to claim 5, wherein the first information includes identification information related to communication with the first terminal or information indicating that the external device is being controlled by the first terminal, and the second information includes identification information related to communication with the second terminal or information indicating that the external device is being controlled by the second terminal.

8. The control method of the printer according to claim 5, wherein the external device is a barcode reader, the terminal is a POS terminal which performs accounting processing based on barcode data read by the barcode reader, and the printer prints a receipt based on the accounting processing performed by the POS terminal.

9. A printing system comprising:

an external device; and a printer configured to be coupled to the external device, and a first terminal and a second terminal on which a web browser operates, wherein the printer generates first information indicating a relationship between the first terminal and a control object controlling the external device when a request for the external device is received from the first terminal, and enables control of the external device by the control object with respect to the first terminal based on the first information, the first information further includes information indicating whether control of the external device is in progress or ends, the printer deletes the first information while the control object is not deleted when the first information indicates the control of the external device by the first terminal ends, generates second information indicating a relationship between the second terminal and the control object when a request for the external device from the second terminal is received after deleting the first information, and enables the control of the external device from the second terminal by the control object based on the second information.

10. The printing system according to claim 9, wherein the printer transmits information indicating that the external device is not controllable to the second terminal when the request for the external device is received from the second terminal before deleting the first information.

11. The printing system according to claim 9, wherein the first information includes identification information related to communication with the first terminal or information indicating that the external device is being controlled by the first terminal, and the second information includes identification information related to communication with the second terminal or information indicating that the external device is being controlled by the second terminal.

12. The printing system according to claim 9, wherein the external device is a barcode reader, the terminal is a POS terminal which performs accounting processing based on barcode data read by the barcode reader, and the printer prints a receipt based on the accounting processing performed by the POS terminal.

* * * * *